(12) United States Patent
Casparian et al.

(10) Patent No.: US 7,982,742 B2
(45) Date of Patent: Jul. 19, 2011

(54) SYSTEM AND METHOD FOR AN INFORMATION HANDLING SYSTEM HAVING AN EXTERNAL GRAPHICS PROCESSOR SYSTEM FOR OPERATING MULTIPLE MONITORS

(75) Inventors: Mark A. Casparian, Miami, FL (US); Frank C. Azor, Miami, FL (US); Gabriel Gonzalez, Miami, FL (US)

(73) Assignee: Dell Products L.P., Round Rock, TX (US)

( * ) Notice: Subject to any disclaimer, the term of this patent is extended or adjusted under 35 U.S.C. 154(b) by 985 days.

(21) Appl. No.: 11/899,521

(22) Filed: Sep. 6, 2007

(65) Prior Publication Data

US 2009/0066705 A1 Mar. 12, 2009

(51) Int. Cl.
*G09G 5/00* (2006.01)
*G06F 15/16* (2006.01)
*G06F 13/14* (2006.01)

(52) U.S. Cl. .......... 345/502; 345/1.1; 345/2.1; 345/503; 345/520

(58) Field of Classification Search ................... 345/1.1, 345/1.3, 502, 520, 2.1, 503
See application file for complete search history.

(56) References Cited

U.S. PATENT DOCUMENTS

| | | | |
|---|---|---|---|
| 5,384,686 A | 1/1995 | Mesfin et al. | |
| 6,626,543 B2 | 9/2003 | Derryberry | |
| 6,724,389 B1 | 4/2004 | Wilen et al. | |
| 6,772,265 B2 | 8/2004 | Baweja et al. | |
| 6,864,891 B2 * | 3/2005 | Myers | 345/502 |
| 7,551,175 B2 * | 6/2009 | Sakanishi et al. | 345/530 |
| 2004/0085726 A1 | 5/2004 | Ting et al. | |
| 2004/0196625 A1 | 10/2004 | Tseng et al. | |
| 2006/0087511 A1 | 4/2006 | Lee | |
| 2006/0279577 A1 | 12/2006 | Bakalash et al. | |

OTHER PUBLICATIONS

Search Report, SC200806422-2; Feb. 6, 2009; 4 pgs.
Intel, White Paper, "Media Expansion Card", Document No. 307620-001, May 2005, 9 pgs.
ExpressCard, ExpressCard Standard Summary, Printed From Internet May 1, 2007, 6 pgs.
ASUS, "ASUS XG Station Empowers Upgradeable Graphics Power for Notebook Computers", Printed From Internet Apr. 23, 2007, 2 pgs.
ARS Technica, Coming Soon: An External Video Card Near You?, Printed From Internet Apr. 23, 2007, 1 pg.
Nvidia, Quardro Plex, "A Quantum Leap in Visual Computing", 2007, 5 pgs.
Nvidia, Quadro Plex 1000, Visual Computing System, 2006, 44 pgs.

* cited by examiner

*Primary Examiner* — Kee M Tung
*Assistant Examiner* — Robert Craddock
(74) *Attorney, Agent, or Firm* — O'Keefe, Egan, Peterman & Enders LLP

(57) ABSTRACT

Methods and systems are disclosed for an information handling system comprising an internal graphics system and an external graphics system, wherein both the internal and external graphics systems may operate simultaneously to support multiple monitors. The internal graphics system may be provided, for example, from a notebook computer. The external graphics system may comprise a pass thru port providing graphics from the internal graphics to a first monitor simultaneously with a graphics card of the external graphics system supporting a second monitor. The external graphics system can support two monitors, as well. HDTV can be supported instead of one of the monitors supported by the external graphics system. The system which contains internal graphics capabilities may include an Express card socket, wherein an external graphics processor unit of the external graphics system is coupled to Express card socket.

23 Claims, 6 Drawing Sheets

SYSTEM AND METHOD FOR AN INFORMATION HANDLING SYSTEM HAVING AN EXTERNAL GRAPHICS PROCESSOR SYSTEM FOR OPERATING MULTIPLE MONITORS

TECHNICAL FIELD

The techniques described herein relate to a system and method for an external graphics processor system, and more particularly to an information handling system comprising a sub-information handling system having an internal graphics system and an external graphics system, wherein both internal and external graphics systems operate simultaneously to support multiple monitors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Current information handling systems, and particularly notebook computers, often have graphics processing capabilities with relatively low powered graphics. Some applications, however, require more graphics capabilities that are more advanced than the internally provided graphics capabilities. For example, users may need more advanced graphics capabilities than are internally provided, such as additional graphics processing MIPS, which can support a better gaming experience, support multiple monitors including HDTV, support dual-link DVI and single-link DVI monitors, etc.

Some prior art systems can support multiple monitors, but are limited to graphics performance included in the existing system. Thus, while these systems may support multiple monitors, there is no graphics performance (MIPS) enhancement that could, for example, improve one's video playback or gaming experience. There is a need for an external graphics processor system to provide existing systems an improved graphics capability, and particularly for an information handling system comprising a sub-information handling system (for example the existing) having an internal graphics capabilities and an external graphics system having external graphics capabilities, wherein both internal and external graphics may be provided simultaneously to support multiple monitors.

SUMMARY

The techniques described herein provide a system and method for an external graphics processor system, and particularly an information handling system comprising a sub-information handling system having an internal graphics system and external device having an external graphics system. Both the internal and external graphics systems may operate simultaneously so that multiple monitors may be simultaneously driven.

Another aspect of the techniques described herein provides an external system, comprising a sub-information handling system having internal graphics processing capabilities and an external graphics system having external graphics processing capabilities. The external graphics system may be coupled to the sub-information handling system to provide externally generated graphics from information provided to the external graphics system by the sub-information handling system. The sub-information handling system and the external graphics system are coupled together in a manner such that both internally generated graphics and externally generated graphics may be provided simultaneously at graphics outputs of the external graphics system. In one embodiment the internally generated graphics are provided to a pass through port of the external graphics system.

In another embodiment, the graphics processor of the external graphics processing system may support two or more monitors. Further, the system which contains internal graphics capabilities may be connected to the external graphics system through an Express card socket, wherein an external graphics processor unit is coupled to the Express card socket.

As described below, other features and variations can be implemented, if desired, and a related method can be utilized, as well.

DESCRIPTION OF THE DRAWINGS

It is noted that the appended drawings illustrate only exemplary embodiments of the techniques described herein and are, therefore, not to be considered limiting of its scope, for the invention may admit to other equally effective embodiments.

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
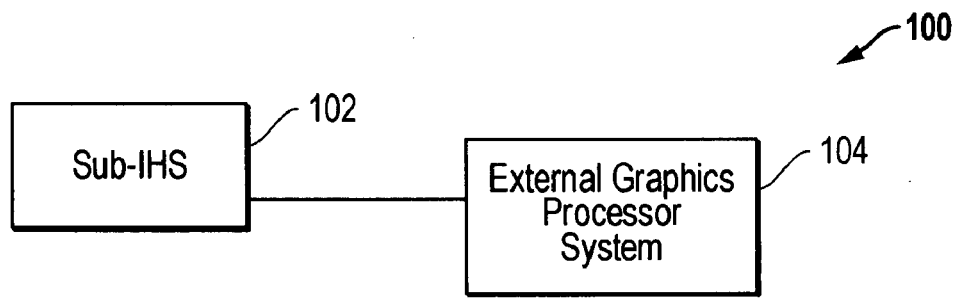
FIG. 1 is a block diagram of an information handling system having an external graphics processing system.

The techniques described herein provide systems and methods for an information handling system having an external graphics processor system for operating multiple monitors. FIG. 1 shows an information handling system having an external graphics processing system 100. The information handling system 100 comprises a sub-information handling system 102, which can be a notebook computer, a personal computer, other computing systems or the like. The sub-information handling system 102 is coupled to the external graphics processing system 104. The sub-information handling system 102 comprises an internal graphics system that may operate simultaneously with the external graphics processing system 104. The internal graphics system may include any internal graphics capabilities including for example, but not limited to, integrated graphics or a graphics card. The information handling system 100 further comprises at least one monitor (not shown in FIG. 1), and can comprise a pass thru port within the external graphics processing system 104, wherein the pass thru port is configured to provide graphics from a sub-information handling system 102 to a first monitor simultaneously with a graphics card supporting a second monitor. The external graphics system 104 can support two monitors, as shown in more detail in FIG. 3. As used herein, the external graphics system 104 is considered to be external to the sub-information handling system as it is a self contained unit that may be physically separated from the sub-information handling system.

Figure 2:
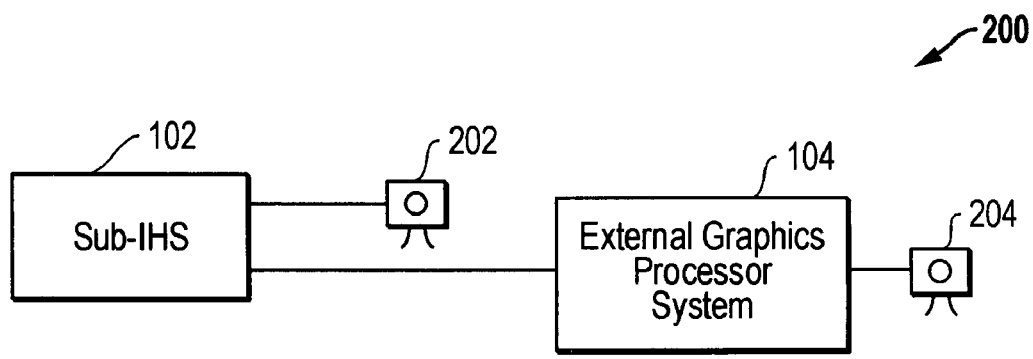
FIG. 2 is a block diagram of an information handling system supporting multiple monitors.

FIG. 2 shows an information handling system supporting multiple monitors 200. The information handling system comprises a sub-information handling system 102 having an internal graphics system that provides graphics to a first monitor 202, and an external graphics processing system 104 made to connect to a sub-information handling system. The external graphics processing system 104 comprises an external graphics processing unit that provides graphics to a second monitor 204.

Figure 3:
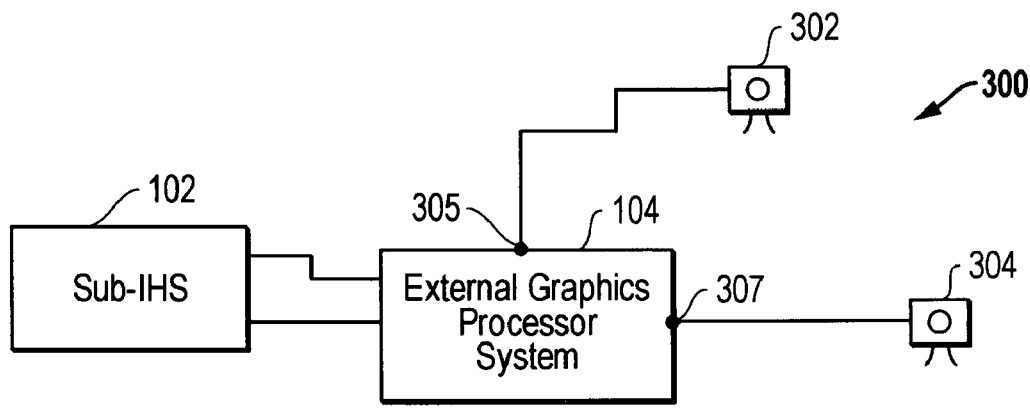
FIG. 3 is a block diagram of an information handling system with an external graphics processing system having a pass thru port.

FIG. 3 shows an information handling system 300 with a pass thru option incorporated in the external graphics processing system 104. The pass thru option can provide graphics from the sub-information handling system 102 through the external graphics processing system 104 to a first monitor 302 simultaneously with a graphics processor of the external graphics processing system 104 supporting a second monitor 304. In a preferred embodiment, the sub-information handling system 102 is a notebook computer, and the internal graphics system of the notebook computer 102 may support one monitor while the external graphics system supports may support another monitor. Thus, an external graphics system is provided which includes graphic outputs 305 and 307, one of which may supply internally generated graphics (i.e. graphics generated internal to the sub-information handling system 102) and externally generated graphics (i.e. graphics generated within the external graphics processing system 104 from information provided from the sub-information handling system 102). It will be understood that the internal graphics and/or the external graphics may also support multiple monitors on its own. Thus for example, the information handling system 300 may support three monitors, one through the use of the internal graphics capabilities and two through the use of the external graphics capabilities. The pass thru option of the external graphics processing system 104 will be described in more detail below with regard to a pass thru port of the external graphics processing system 104. The use of a pass thru option on the external graphics processing system 104 is particularly advantageous in allowing ease of monitor connections for a user as all the monitors may be connected to the external graphics processing system 104. Thus, for example when using a notebook computer, the notebook computer may simply be docked with the external graphics processor system 104 allowing the use of multiple monitors and/or the more advanced graphics capabilities of the external graphics processor system 104.

Figure 4:
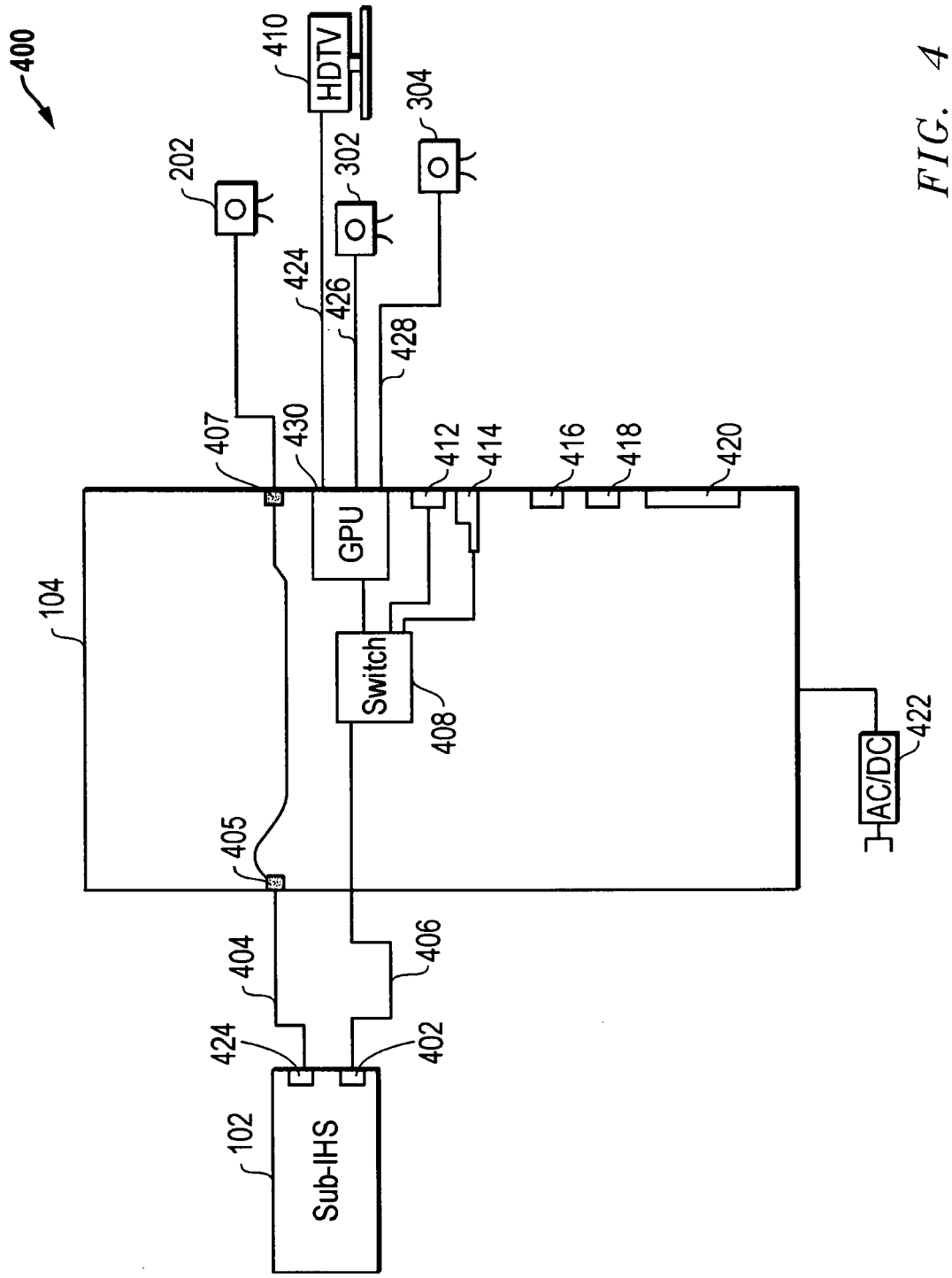
FIG. 4 is a block diagram of an information handling system supporting multiple monitors via internal and external graphics systems.

FIG. 4 shows a more detailed view of an information handling system 400 having an internal and external graphics system supporting multiple monitors. As shown in FIG. 4 the external graphics system may support multiple monitors itself, including an HDTV monitor. The information handling system 400 comprises a sub-information handling system 102 that has internal graphics processing capabilities. For example, the internal graphics processing capabilities may be provided from a DVI port 424. A DVI connector 404 may couple the internal graphics to a pass thru input port 405 of the external graphics processing system 104. A pass thru output port 407 may be used to provide the internal graphics to a monitor 202. As shown in FIG. 4, graphics may be provided from the pass thru input port 405 to the pass thru output port 407 with relatively little processing within the external graphics processing system 104. However, optionally additional graphic processing may be performed on the pass thru signal will still being considered a pass through signal as the graphics in question are initially generated by the graphic systems internal to the sub-information handling system 102.

It will be recognized that the sub-information handling system 102 and the external graphics processing system 104 may be directly docked together negating the need for connector 404 (likewise negating the need for connector 406 discussed below). The sub-information handling system 102 further comprises an Express card slot 402. The external graphics processing system 104 containing a PCI Express (hereafter referred to as "PCIe") based GPU 430 and connects to the sub-information handling system 102 via the sub-information handling system's express card slot 402 and switch 408. Thus, FIG. 4 shows an embodiment having an external graphics accelerator embedded in a port replicator or docking unit through which Express card technology is utilized to couple an external processor to the sub-information handling system 102. Express card technology provides an increase in bandwidth, since the Express card has a connection to the system bus over a PCIe x1 lane and USB 2.0, as shown in more detail in FIG. 5. Though described herein with reference to exemplary connection to the sub-information handling system through an Express card slot, it will be recognized that the techniques provided herein may be utilized with any other technology that would allow connectivity of an external graphics card to the internal buses of the sub-information handling system. Thus, the description of the use of Express card technology provided herein is meant to be exemplary and not limiting.

In FIG. 4, the user can upgrade the sub-information handling system's current graphics capability, including support for multiple monitors 202, 302, 304, and HDTV 410, allowing support for dual-link DVI devices, as well as HDCP protected content. Further when the internal graphics capabilities are insufficient, the graphics processor unit (GPU) card 430 in the port replicator/external graphics accelerator unit acts as a graphics performance (MIPS) upgrade, allowing them a significantly better graphics experience. Monitors 302, 304 and HDTV 410 are supported from the GPU card 430 via connections 424, 426, 428 from the GPU card 430 to these devices, 302, 304, 410. In the case of a GPU card 430 supporting a dual-link DVI output (426 or 428), the user can also use a 30" flat panel monitor, for example. For users with high-end internal graphics capabilities, the DVI pass thru input and output ports 405 and 407 allow the user to continue to experience the system's high-end graphics performance on an external monitor 202. In such circumstances, the additional GPU card 430 would still allow for viewing video and/or graphics on an additional two monitors 302, 304, and 410. The user is able to enjoy the internal system's high-level graphics performance while enjoying the benefits of an additional GPU card 430 supporting additional monitors 302, 304, 410 and/or devices. Thus, the techniques described herein are beneficial even when high end internal graphics capabilities are available.

As shown in FIG. 4 the GPU card 430 is coupled to the Express card slot 402 through a switch 408. Switch 408 enables additional utilization of the Express card slot 406, including Ethernet ports and other PCI-e connections, such as a spare express card socket 414, and Gigabit Ethernet 412. FIG. 4 also shows an AC/DC adapter 422 that may provide power to the external graphics system 104. Thus, the use of the external graphics processing system 104 does not prevent the Express card slot 402 from being used for other purposes. Connections such as audio 416, USB 418, and memory card reader 420 may also be provided.

Figure 5:
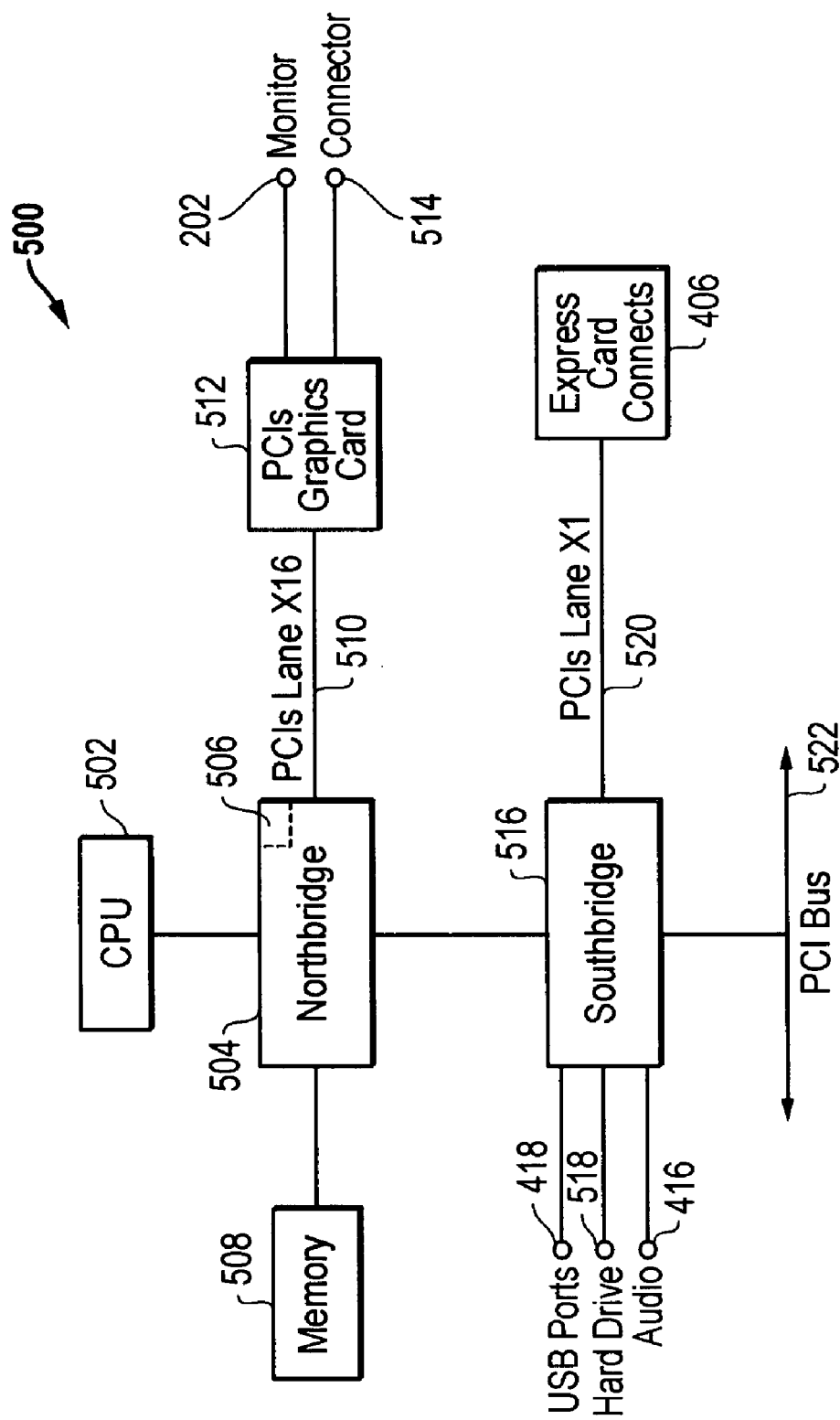
FIG. 5 is a block diagram of an exemplary system supporting Express card technology.

As mentioned above, Express card technology is utilized as an exemplary technique to couple the external graphics capability to the internal buses of sub-information handling system 102. FIG. 5 shows exemplary details of a system 500 utilizing Express card technology. PCI Express (hereafter referred to as "PCIe") is known in the art as a computer system bus/expansion card interface format. PCIe uses multiple connections that individually transmit a single stream of data in parallel to one another, which is referred to as "channel bonding". A PCIe system 500 comprises a core logic chipset that acts as a switch or router that routes input/output (I/O) traffic among different devices in the system 500. The core logic chipset is made up of a Northbridge 504 and a Southbridge 516. The Northbridge 504 (which may comprise its own integrated graphics 506) is connected to devices that naturally work closely together, such as the CPU 502, memory 508, and PCIe x16 based graphics card 512.

The Northbridge 504 is connected to the Southbridge 516, a secondary bridge that routes traffic from different I/O devices in the system, such as USB ports 418, hard drive 518, audio 416, and express card connector 406. It will be recognized by those in the art, however, that techniques of locating the Expresscard interface vary depending on the chipset architecture selected. In some instances it may be located in the Northbridge IC, in other cases, in the Southbridge IC. The traffic from these devices is routed thru the Southbridge 516 to the Northbridge 504, and then to the CPU 502 and/or memory 508. The PCIe bus is both full duplex and point to point, so that PCIe has better performance if multiple device pairs communicate simultaneously or if communication with a single device pair is bidirectional. The PCIe link is built around dedicated unidirectional couples of serial, point to point connections or "lanes". All devices in a PCIe system generally support at least a single lane (x1) link. Devices may support wider links composed of 2, 4, 8, 12, or 16 lanes. PCIe sends all control messages, including interrupts, over the same links used for data. FIG. 5 shows a PCIe bus x16 lane 510 from the Northbridge 504 to the PCIe graphics card 512, and a PCIe x1 lane 520 from the Southbridge 516 to the express card slot 406.

Figure 6:
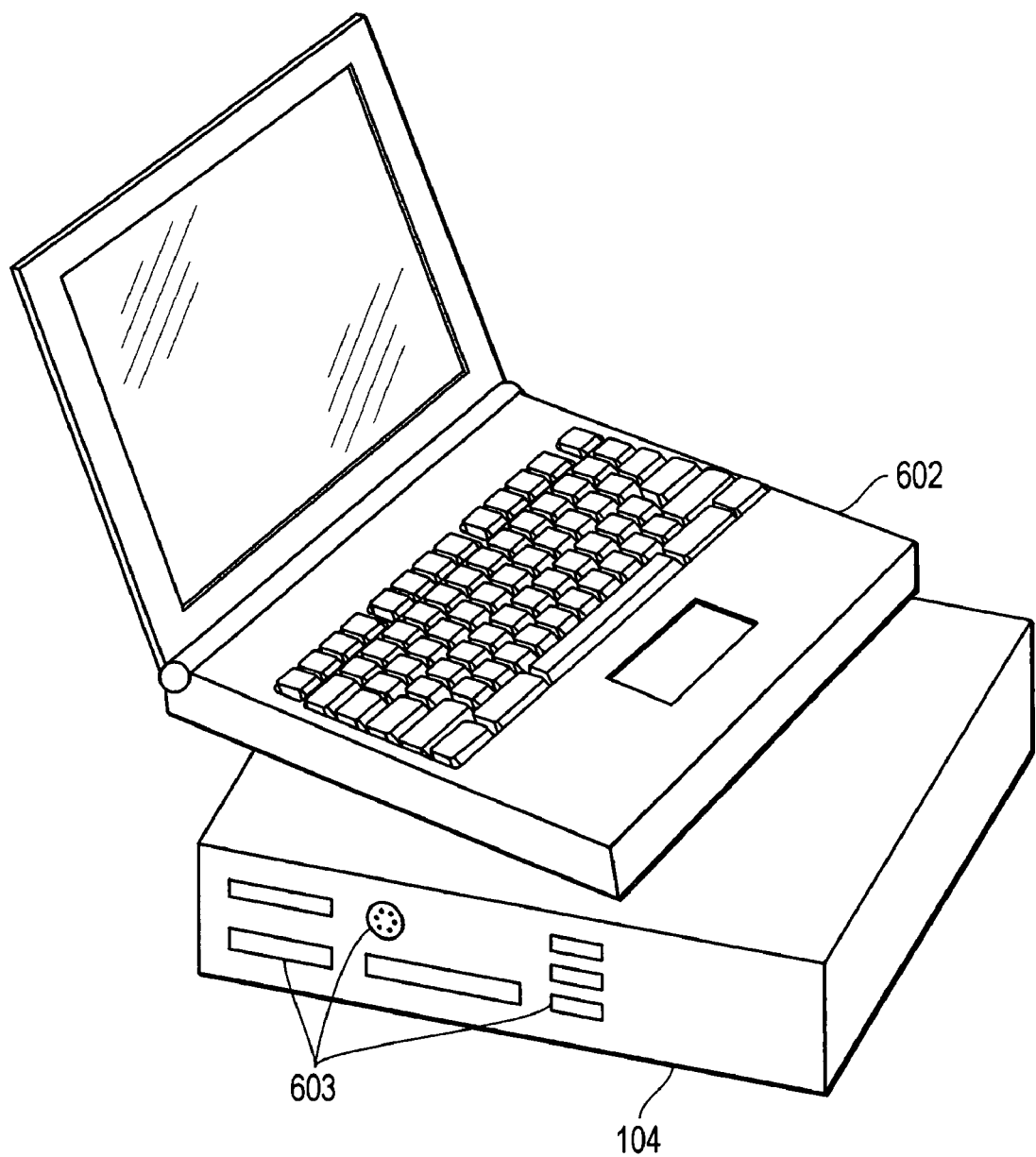
FIG. 6 illustrates the mounting of a computing system on an external graphics system.

As described above, the sub-information handling system 102 may be a notebook computer. FIG. 6 illustrates one exemplary use of an external graphics processing system 104 in which a notebook computer 602 may be mounted on top of the external graphics processing system 104. As shown in FIG. 6, such a configuration conserves space as the external graphics processing system may have a footprint that is substantially similar (or smaller) than the notebook computer. The mounting of the notebook may be accomplished with snap together connectors or any other mounting mechanism. Further, the mounting may be such that the notebook computer is flat with respect to the external graphics processing system or may be tilted (as shown) at a fixed or variable angle as such choices will be designer and user specific. As shown in the FIG. 6, various connector slots 603 may be provided on the external graphics processing system 104 to provide the DVI, Express card, or other connections between the notebook computer 602, the external graphics processing system 104 and even other devices through the use of wires, cords and the like. Alternatively, though not shown, the external graphics processing system 104 and the notebook computer 602 may be configured to directly dock together to negate the need for the use of additional wires and cords. In yet another embodiment, the external graphics processing system 104 may provide full docking station capabilities such as being connected to other devices (for example keyboards and the like).

Figure 7:
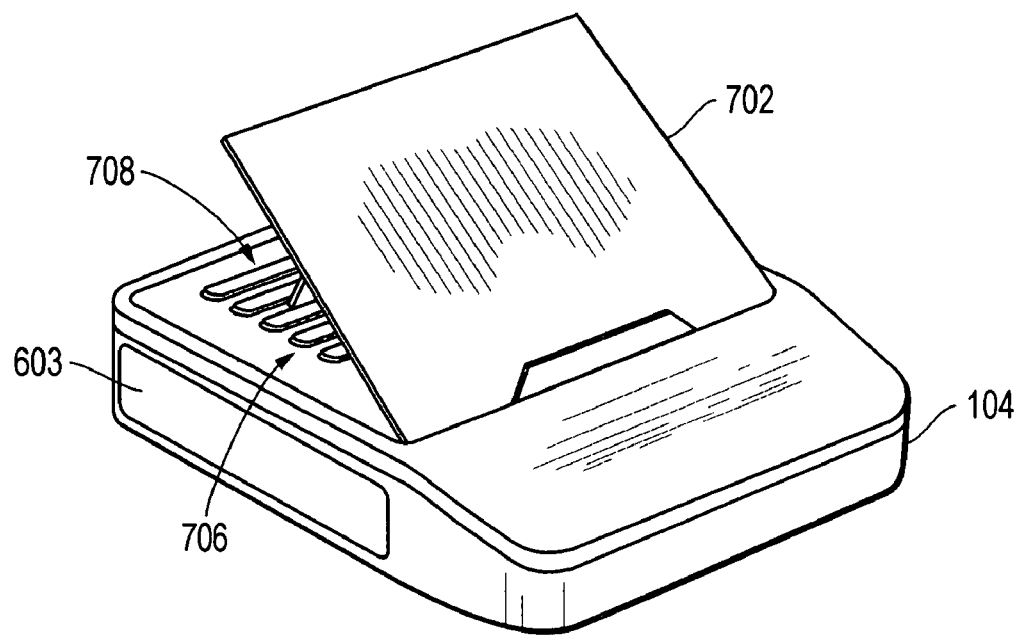
FIGS. 7 and 8 illustrate a perspective and side view of a support system on an external graphics system on which a computing system may be mounted.
Figure 8:
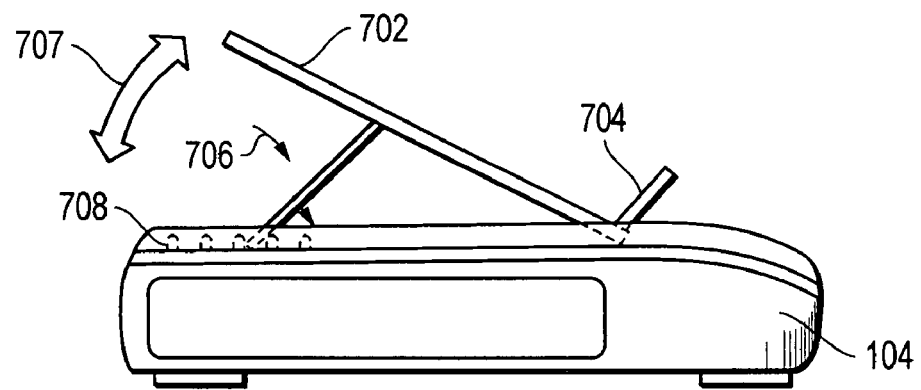
Figure 9:
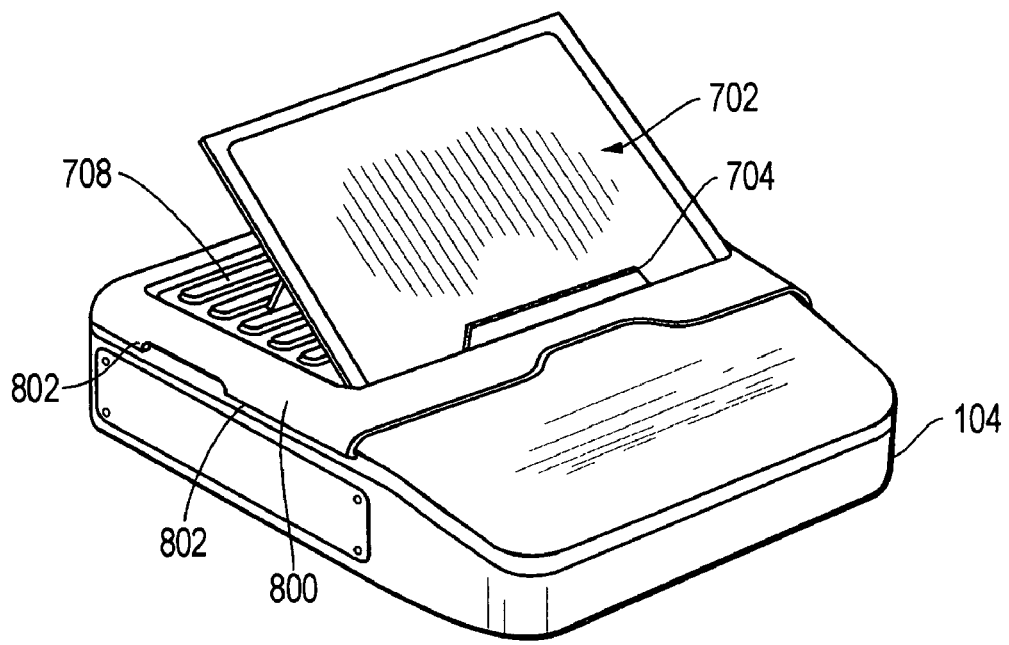
FIGS. 9 and 10 illustrate a perspective and side view of another embodiment of a support system on an external graphics system on which a computing system may be mounted.

FIGS. 7 and 8 illustrate an exemplary mounting system that may be utilized to mount a notebook computer 602 on an external graphics processing system 104. FIGS. 8 and 9 illustrate an alternative mounting system. It will be recognized that the mounting systems shown are exemplary and that other mounting systems may be utilized to obtain the space saving advantages described above. As shown in FIGS. 7 and 8, a support surface 702 may be provided to hold a notebook computer. A lip 704 may be provided to act as a stopper to prevent the notebook from sliding. The support surface 702 may be formed of any of a number of materials. In one example, the surface may be a rubber like surface so as to provide friction to more firmly hold the notebook in place. The lip 704 may be configured to pop up so that when not in use it is may be placed in a downward position. The mounting system may be configured so as to be fixed or adjustable. As shown, an adjustable mounting system is provided in which the support surface angle 707 may be adjusted. This allows for the notebook to be placed at differing angles. In one embodiment the angle of movement may be such that the support surface 702 may be moved to a substantially flat downward position relative to the external graphics processing system 104. Any of a wide variety of techniques may be used to move and secure the different positions of the support surface 702. In one example as shown in FIGS. 7 and 8, a moveable support arm 706 is provided. The support arm 706 may be moved to a variety of positions to adjust the angle 707 by engaging the bottom of support arm 706 with differing ones of arm engagement projects 708. By selecting which position to place the support arm 706, the angle 708 of the support surface 702 is adjusted.

Figure 10:
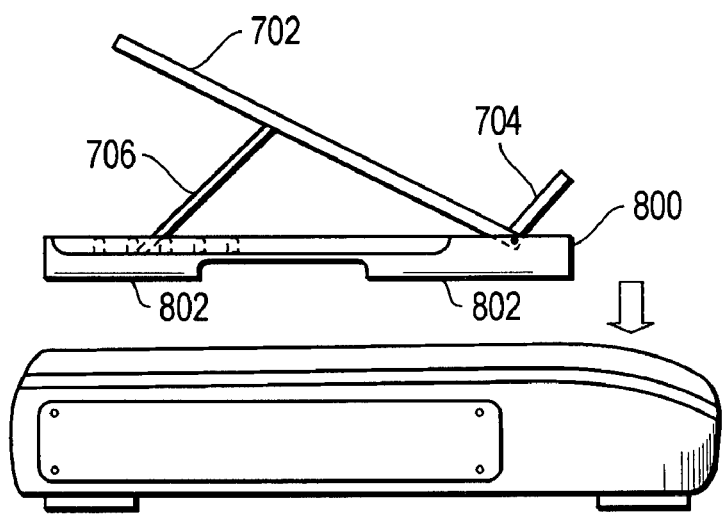

As shown in FIGS. 7 and 8, the mounting system may be integrally formed as part of the external graphics processing system 104. In an alternative embodiment, a separate mounting system 800 may be provided as shown in FIGS. 9 and 10. The mounting system 800 may be similar to that of FIGS. 7 and 8 with regard to the use of a support surface 702, lip 704, support arm 706, and arm engagement projections 708. However, the mounting system 800 of FIGS. 9 and 10 may be detachable from the external graphics processing system 104 as shown more clearly in FIG. 10. In one embodiment, the mounting system 800 may include tabs 802 which snap into indents within the external graphics processing system 104. In this manner, a detachable mounting system is provided so that the external graphics processing system 104 need not include the mounting system while at the same time includes mechanisms that allow for a detachable mounting system to be attached. Though the embodiments shown in FIGS. 7-10 include mounting systems, it will be recognized that as described above the external graphics processing system 104 need not include a mounting system. Further, though shown in a horizontal placement, the external graphics processing system 104 may also be placed vertical.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. An information handling system, comprising:
a sub-information handling system having internal graphics processing capabilities; and
an external graphics system having external graphics processing capabilities, the external graphics system coupled to the sub-information handling system to provide externally generated graphics from information provided to the external graphics system by the sub-information handling system, the information provided to the external graphics system to provide externally generated graphics being provided from the sub-information handling system in a manner that bypasses the internal graphics processing capabilities of the sub-information handling system,
wherein the sub-information handling system and the external graphics system are coupled together in a manner such that both internally generated graphics and externally generated graphics may be provided simultaneously at separate graphics outputs of the external graphics system and being coupled together in a manner in which the internally generated graphics pass through the external graphics system without being processed by the external graphics processing capabilities.

2. The information handling system of claim 1, wherein the sub-information handling system is a notebook computer.

3. The information handling system of claim 2, wherein the external graphics system further comprising a pass thru port to provide the internally generated graphics at a graphics output of the external graphics system.

4. The information handling system of claim 3, wherein the pass thru port is configured to provide internally generated graphics from the notebook computer to a first monitor simultaneously with externally generated graphics being provided from an external graphics card of the external graphics system being provided to a second monitor.

5. The information handling system of claim 4, wherein the external graphics system supports two monitors.

6. An external graphics processing system, comprising:
an external system made to connect to a computing system;
an external graphics processing unit within the external system; and
a pass thru port configured to pass internal graphics from the computing system through the external system to a monitor, so that the internal graphics bypasses the external graphics processing unit,
wherein the pass thru port provides internal graphics from the computing system to a first monitor simultaneously with the external graphics processing unit providing graphics supporting a separate second monitor.

7. The external graphics processing system of claim 6, wherein the computing system is a notebook computer.

8. The external graphics processing system of claim 7, wherein the external graphics processing unit supports two monitors.

9. The external graphics processing system of claim 7, wherein the notebook computer comprises an express card socket.

10. The external graphics processing system of claim 9, wherein the external graphics processing unit is coupled to an Express card slot.

11. A method of configuring an information handling system, comprising:
providing a sub-information handling system having an internal graphics system;
providing an external graphics system having an external graphics processor; and
coupling the internal graphics system and the external graphics system together to enable the simultaneous provision of internally generated graphics and externally generated graphics at outputs of the external graphics system so that the internally generated graphics are generated in a manner that bypasses the external graphics processor and the externally generated graphics are generated in a manner that bypasses the internal graphics system.

12. The method of claim 11, wherein the sub-information handling system is a notebook computer.

13. The method of claim 12, wherein the external graphics system comprises a pass thru port for providing the internally generated graphics.

14. The method of claim 13, wherein the pass thru port is configured to provide graphics from the notebook computer to a first monitor simultaneously with external graphics being provided to a second monitor, the external graphics being generated from an external graphics card within the external graphics system.

15. The method of claim 14, wherein the coupling is performed by docking the notebook computer to the external graphics system.

16. A system configured to be coupled to a computing system, comprising:
an external graphics processing system configured to be coupled to the computing system by mounting the computing system on top of the external graphics processing system; and
an external graphics processing unit inside the external graphics processing system, external generated graphics being generated by the external graphics processing unit from information provided to the external graphics processing system from the computing system the external graphics processing unit further comprising a pass thru port configured to pass graphics from the computing system through to a monitor without processing by the external graphics processing unit to allow graphics from the computing system to be provided to a first monitor simultaneously with the external graphics processing unit supporting a second monitor, the first and second monitors being separate.

17. The system of claim 16, further comprising an adjustable mounting system upon which the computing system is mounted.

18. The system of claim 17, further comprising at least one adjustable support arm, wherein adjustment of the support arm alters a mounting angle of the adjustable mounting system so as to adjust the angle of placement of the computing system.

19. The system of claim 16, wherein a footprint of the external graphics processing system is substantially the same as or less than a footprint of the computing system.

20. The system of claim 16, wherein the computing system is a notebook computer and the notebook computer docks with the external graphics processing system.

21. The system of claim 20, wherein the notebook computer comprises an Express card slot.

22. The system of claim 21, wherein the external graphics processing unit is coupled to the Express card slot.

23. The system of claim 20, wherein the external graphics system is a docking station.

* * * * *